US008401043B1

(12) United States Patent
Kadosh et al.

(10) Patent No.: US 8,401,043 B1
(45) Date of Patent: Mar. 19, 2013

(54) HARDWARE INTERFACE UTILIZING ALIGNMENT SYMBOLS FOR DEMULTIPLEXING

(75) Inventors: Aviran Kadosh, Misgav (IL); Nafea Bishara, San Jose, CA (US); Yariv Anafi, Kerem Maharal (IL)

(73) Assignees: Marvell Israel (M.I.S.L) Ltd., Yokneam (IL); Marvell International Ltd., Hamilton (BM)

( * ) Notice: Subject to any disclaimer, the term of this patent is extended or adjusted under 35 U.S.C. 154(b) by 620 days.

(21) Appl. No.: 12/621,268

(22) Filed: Nov. 18, 2009

Related U.S. Application Data (60) Provisional application No. 61/115,724, filed on Nov. 18, 2008.

(51) Int. Cl.
*H04J 3/04* (2006.01)
(52) U.S. Cl. .............. 370/536; 370/465; 370/537
(58) Field of Classification Search .......... 370/230, 370/465, 466, 536, 537, 542
See application file for complete search history.

(56) References Cited

U.S. PATENT DOCUMENTS

| | | | |
|---|---|---|---|
| 6,751,743 B1* | 6/2004 | Theodoras et al. | 713/400 |
| 7,020,729 B2 | 3/2006 | Taborek, Sr. et al. | |
| 7,516,237 B2* | 4/2009 | Booth et al. | 709/232 |
| 7,728,625 B1* | 6/2010 | Nechamkin et al. | 326/41 |
| 2008/0169946 A1* | 7/2008 | Shin et al. | 341/100 |
| 2009/0080584 A1* | 3/2009 | Hamano et al. | 375/371 |
| 2009/0125652 A1* | 5/2009 | Huff | 710/71 |
| 2011/0103440 A1* | 5/2011 | Huff | 375/220 |

OTHER PUBLICATIONS

D. Lewis, "SerDes Architectures and Applications," National Semiconductor Corporation, presented at DesignCon 2004 (Feb. 2-5, 2004), available at <http://www.national.com/appinfo/lvds/files/designcon2004_serdes.pdf>.
"XAUI interface—Introduction to XAUI," 10 Gigabit Ethernet Alliance (2008), available at <http://www.10gea.org/xaui-interface-introduction-to-xaui,htm>.
"10 Gigabit Ethernet and the XAUI interface—Product Note," Agilent Technologies (2002), available at <http://cp.literature.agilent.com/litweb/pdf/5988-5509EN.pdf>.

* cited by examiner

*Primary Examiner* — Kwang B Yao
*Assistant Examiner* — Nguyen Ngo

(57) ABSTRACT

In a data transfer interface, at least one deserializer receives a serial data stream at a first clock speed and outputs a first parallel data stream at a second clock speed. The first parallel data stream includes data symbols representing data and alignment symbols for aligning the data symbols at a downstream location. A demultiplexer demultiplexes the first parallel data stream into a plurality of second parallel data streams based on the alignment symbols.

20 Claims, 9 Drawing Sheets

HARDWARE INTERFACE UTILIZING ALIGNMENT SYMBOLS FOR DEMULTIPLEXING

CROSS-REFERENCE TO RELATED APPLICATION

This is a regular-filed application that claims the benefit of U.S. Provisional Patent Application No. 61/115,724, entitled "RXAUI Interface and RXAUI Adapter," which was filed on Nov. 18, 2008, the entire disclosure of which is hereby incorporated by reference herein.

FIELD OF THE DISCLOSURE

The present disclosure relates generally to hardware interfaces and, more particularly, to serial interfaces.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

10 Gigabit Ethernet, a popular and growing technology, is standardized in the IEEE 802.3ae Standard. For example, the IEEE 802.ae Standard specifies a 10 Gigabit Media Independent Interface (XGMII) between a media access control layer (MAC) and a physical layer (PHY). XGMII provides a full duplex channel operating at 10 gigabits per second (Gb/s). For each direction, XGMII includes 36 parallel signals: a 32-bit data path and 4 control signals (one control signal per 8-bits of data). The total width of XGMII is 74 signals. Because of the width of XGMII, chip-to-chip, board-to-board, and chip-to-optical module interfacing using XGMII is impractical.

The 10 Gigabit Ethernet Task Force developed another interface, the 10 Gigabit Attachment Unit Interface (XAUI), that interfaces with XGMII and provides four self-clocked serial differential lanes in each direction. XAUI also operates at 10 Gb/s but requires only 16 signals, as compared to the 74 signals of XGMII. XAUI significantly reduces the number of signals and allows easier chip-to-chip, board-to-board, and chip-to-optical module interfacing as compared to XGMII.

SUMMARY

In one embodiment, a data transfer interface comprises at least one deserializer to receive a serial data stream at a first clock speed and to output a first parallel data stream at a second clock speed, wherein the first parallel data stream includes data symbols representing data and alignment symbols for aligning the data symbols at a downstream location. The data transfer interface also comprises a demultiplexer that demultiplexes the first parallel data stream into a plurality of second parallel data streams based on the alignment symbols.

In another embodiment, a data transfer interface method includes converting a serial data stream at a first clock speed to a first parallel data stream at a second clock speed, wherein the first parallel data stream includes data symbols representing data symbols and alignment symbols for aligning the data symbols at a downstream location. Additionally, the method includes demultiplexing the first parallel data stream into a plurality of second parallel data streams based on the alignment symbols.

In yet another embodiment, a network switch comprises a data transfer interface. The data transfer interface includes at least one deserializer to receive a serial data stream at a first clock speed and to output a first parallel data stream at a second clock speed, wherein the first parallel data stream includes data symbols representing data and alignment symbols for aligning the data symbols at a downstream location. Also, the data transfer interface includes a demultiplexer that demultiplexes the first parallel data stream into a plurality of second parallel data streams based on the alignment symbols.

DETAILED DESCRIPTION

Example interfacing methods and apparatus are described herein in the context of communication systems, such as but not limited to Ethernet switches, that operate according to the IEEE 802.3ae Standard. Although described in the context of the IEEE 802.3ae Standard, it is noted that these methods and apparatus may be used in various other types of communication systems and are not limited to Ethernet switches or to other systems conforming to the IEEE 802.3ae Standard.

Example interfacing methods and apparatus described herein generally relate to converting a first hardware interface with a relatively wide width (i.e., number of signals) to a second hardware interface with a much smaller width (i.e., a much smaller number of signals). In effect, the number of signals in the hardware interface is reduced, making chip-to-chip, board-to-board, and/or chip-to-optical module interfacing and routing easier to implement.

Figure 1:
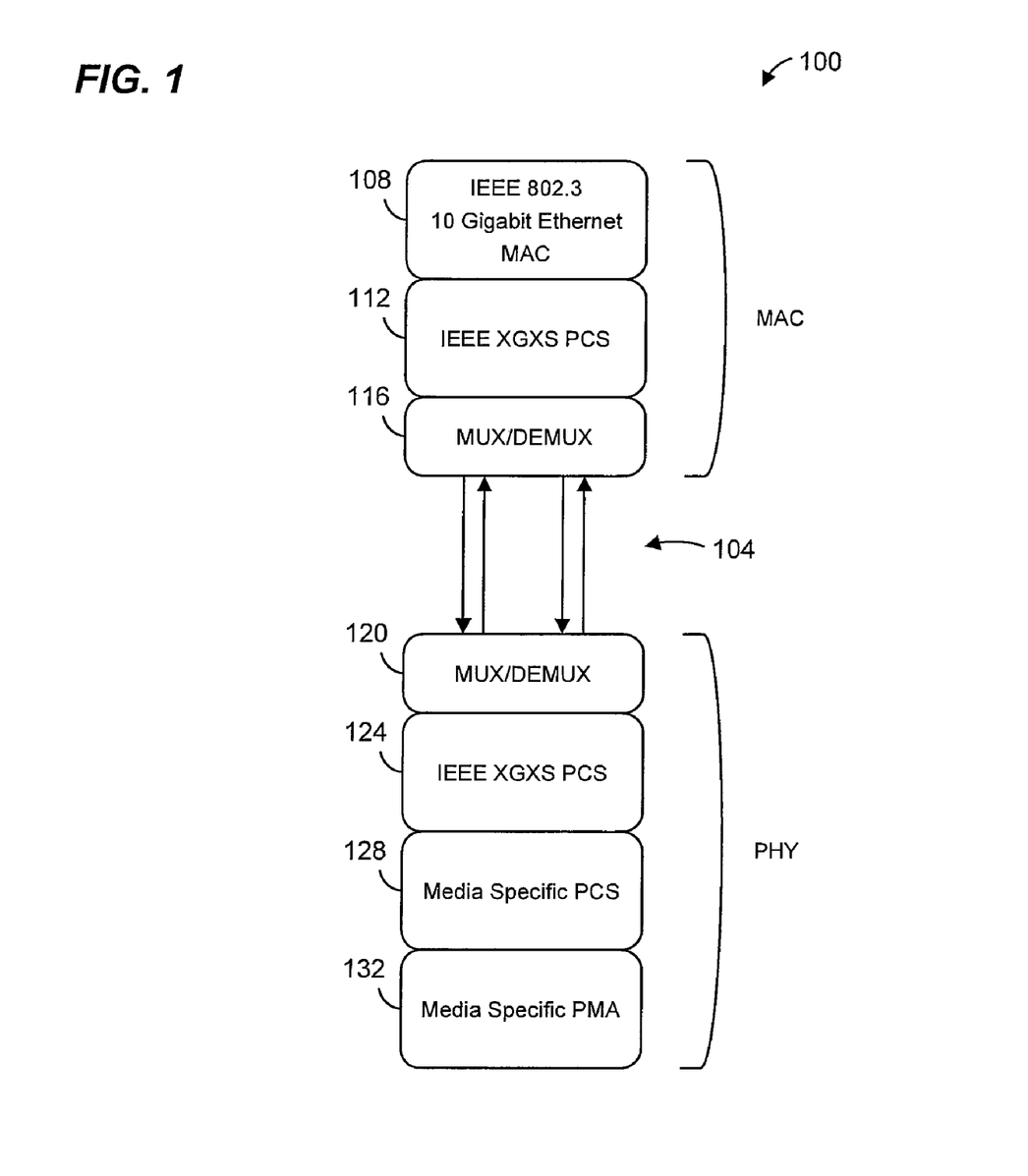
FIG. 1 is a block diagram of an example port subsystem of a communication device.

FIG. 1 is a block diagram of an example port subsystem 100 of a communication device, such as an Ethernet switch, the port subsystem 100 including a media access control layer (MAC) block and a physical layer (PHY) block. The port subsystem 100 is hereinafter referred to as the port 100.

In accordance with an embodiment of the disclosure, the MAC block is implemented on a first integrated circuit (IC) chip and the PHY block is implemented on a second IC chip. As another example, the MAC block is implemented on a first device (e.g., an IC chip) and the PHY block is implemented on a second device (e.g., an optical module). As yet another example, the MAC block is implemented on a first device located on a first printed circuit board and the PHY block is implemented on a second device located on a second printed circuit board. In any of these examples, an interface 104 is required to transmit signals between the MAC block and the PHY block.

In the example port 100, the MAC block includes a MAC processor 108 that implements MAC functions that conform to the IEEE 802.3 Standard. For example, the MAC processor 108 implements MAC functions corresponding to a port of a switch. The MAC processor 108 is coupled to a 10 Gigabit Media Independent Interface (XGMII) extended sublayer (XGXS) adapter 112. The MAC processor 108 and the XGXS adapter 112 communicate via an XGMII interface. In accordance with the IEEE 802.3ae Standard, the XGMII interface includes 64 data signals (32 transmit and 32 receive) and ten control and clock signals. The XGXS adapter 112 converts the 74 signals of the XGMII interface into eight signals (four pairs of transmit and receive signals), and also performs physical coding sublayer (PCS) encoding and decoding. Each pair of transmit and receive signals is referred to as a 10 Gigabit Attachment Unit Interface (XAUI) lane. In one implementation, each XAUI lane transmits and receives 10-bit words in accordance with the IEEE 802.3ae Standard. In another implementation, each XAUI lane transmits and receives 20-bit words in accordance with the IEEE 802.3ae Standard. In other implementations, such as implementations that do not conform to the IEEE 802.3ae Standard, data is transmitted via lanes having a width other than 10-bits or 20-bits.

The XGXS adapter 112 is coupled to a multiplexer/demultiplexer (MUX/DEMUX) adapter 116. The MUX/DEMUX adapter 116 converts the four XAUI lanes into four differential, serial signals (two transmit signals and two receive signals) of the interface 104. Pairs of transmit and receive signals in the interface 104 are grouped into lanes. Thus, the interface 104 includes two lanes, referred to as reduced XAUI (RXAUI) lanes. MUX/DEMUX adapter 116 is sometimes referred to herein as an RXAUI adapter 116. More generally, the MUX/DEMUX adapter 116 converts the XAUI lanes into a smaller number of RXAUI lanes. Thus, in other implementations, the number of RXAUI lanes may be different than two (e.g., if there are four XAUI lanes, the MUX/DEMUX adapter 116 can convert the XAUI lanes into three RXAUI lanes or one RXAUI lane).

With regard to the PHY block, a MUX/DEMUX adapter 120 is coupled to the MUX/DEMUX adapter 116 via the RXAUI interface 104. In the embodiment of FIG. 1, the MUX/DEMUX adapter 120 converts the four differential, serial signals of the interface 104 into the four XAUI lanes. In other words, the MUX/DEMUX adapter 120 converts the two RXAUI lanes of the interface 104 into the four XAUI lanes. More generally, the MUX/DEMUX adapter 120 converts the RXAUI lanes into a larger number of XAUI lanes. Thus, in other implementations, the number of RXAUI lanes may be different than two. The MUX/DEMUX adapter 120 is coupled to a XGXS adapter 124. The XGXS adapter 124 performs PCS encoding and decoding and converts the four XAUI lanes into the 74 signals of the XGMII interface.

A PCS encoder/decoder 128 is coupled to the XGXS adapter 124 via the XGMII interface. The PCS encoder/decoder 128 performs PCS encoding/decoding for the particular type of communication media via which data is to be transmitted and received. The PCS encoder/decoder 128 is coupled to a physical media attachment sublayer (PMA) block. The PMA block serializes/deserializes signals to be transmitted or that were received via the communication media. The PMA block performs encoding/decoding suitable for the particular communication media.

The MAC block and the PHY block can be implemented/located on different IC chips, devices, printed circuit boards, etc., and are communicatively coupled via the RXAUI interface 104. Because the RXAUI interface 104 has only four differential data signals, as opposed to eight differential data signals as in the XAUI interface or 74 signals as in XGMII, routing, interconnection, etc., between MAC blocks and PHY blocks is made easier. Additionally, in accordance with an embodiment of the disclosure, the reduced number of signals in the interface 104 allows a higher density of ports in a switch, at least in some implementations, compared to implementations in which interfaces between MAC blocks and PHY blocks utilize XAUI lanes.

As will be described in greater detail below, the XGXS adapter 112 inserts alignment symbols or bytes into data streams according to the XAUI specification. The alignment symbols are meant to be used by a XAUI compliant receiver on the other end of a XAUI interface to align data sent across a XAUI interface. The alignment symbols are included in the data sent across the RXAUI interface 104. As will be described in greater detail below, the MUX/DEMUX adapter 120 uses these alignment symbols to demultiplex words sent via an RXAUI lane into appropriate XAUI lanes.

Similarly, the XGXS adapter 124 inserts alignment symbols into data streams to be sent to the MAC. These alignment symbols are also included in the data streams that are sent via the RXAUI interface 104, and the MUX/DEMUX adapter 116 uses these alignment words to demultiplex words into appropriate XAUI lanes.

Figure 2:
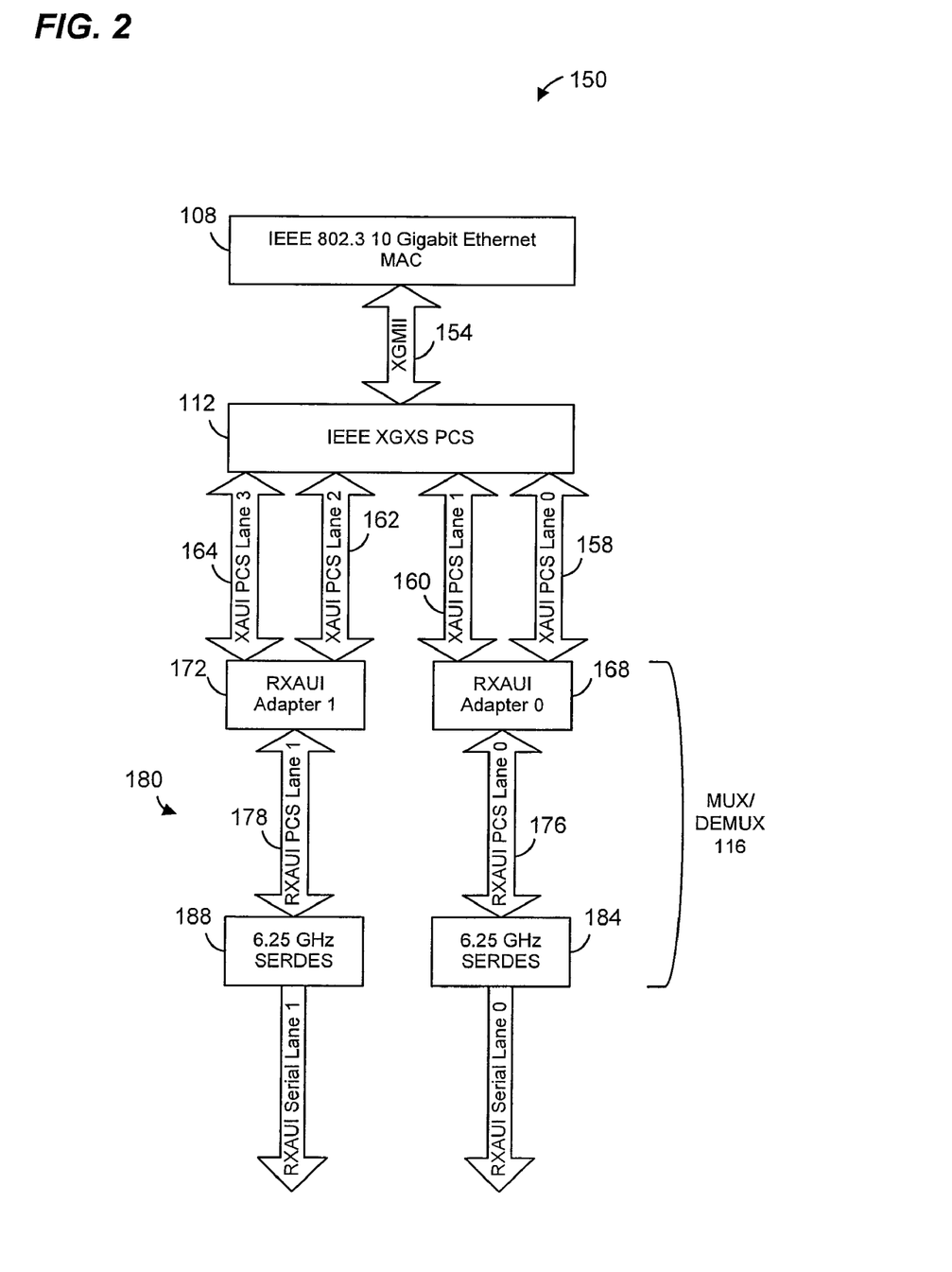
FIG. 2 is a block diagram of an example MAC block that may be utilized with the port subsystem of FIG. 1.

FIG. 2 is a block diagram of an example implementation of the MAC block of FIG. 1. The MAC block 150 includes the MAC processor 108, the XGXS adapter 112, and the MUX/DEMUX 116 discussed with reference to FIG. 1. As discussed previously, the MAC processor 108 and the XGXS adapter 112 exchange data via an XGMII interface 154. Also as discussed previously, the XGXS adapter 112 and the MUX/DEMUX 116 exchange data via four XAUI lanes 158, 160, 162, 164.

In one implementation, each XAUI lane 158, 160, 162, 164 is 20 bits wide (10-bit receive and 10-bit transmit). In this implementation, the XAUI lanes 158, 160, 162, 164 are clocked at 312.5 MHz. In another implementation, each XAUI lane 158, 160, 162, 164 is 40 bits wide (20-bit receive and 20-bit transmit). In this implementation, the XAUI lanes 158, 160, 162, 164 are clocked at 156.25 MHz.

The XAUI lanes 158, 160 are coupled to a reduced XAUI (RXAUI) adapter 168, and the XAUI lanes 162, 164 are coupled to an RXAUI adapter 172. The RXAUI adapter 168 multiplexes data from the XAUI lanes 158, 160 onto a single RXAUI lane 176. Similarly, the RXAUI adapter 172 multiplexes data from the XAUI lanes 162, 164 onto a single RXAUI lane 178. In the implementation in which each of the XAUI lanes 158, 160, 162, 164 transmits and receives 10-bit words and operates at 312.5 MHz, each RXAUI lane 176, 178 also transmits and receives 10-bit words, but operates at 625

MHz. In the implementation in which the XAUI lanes 158, 160, 162, 164 each transmits and receives 20-bit words and operates at 156.25 MHz, each RXAUI lane 176, 178 also transmits and receives 20-bit words but operates at 312.5 MHz.

Each RXAUI lanes 176, 178 is coupled to a respective serializer/deserializer (SERDES) 184, 188. Each SERDES 184, 188 serializes words received from the respective RXAUI lane 176, 178. Each SERDES 184, 188 generates a respective pair of differential signals to transmit the serialized words. Additionally, each SERDES 184, 188 deserializes words received from a respective pair of differential signals. The deserialized words are provided on the RXAUI lanes 176, 178. Each of the SERDES 184, 188 transmit/receive serial data at 6.25 Gb/s.

Figure 3A:
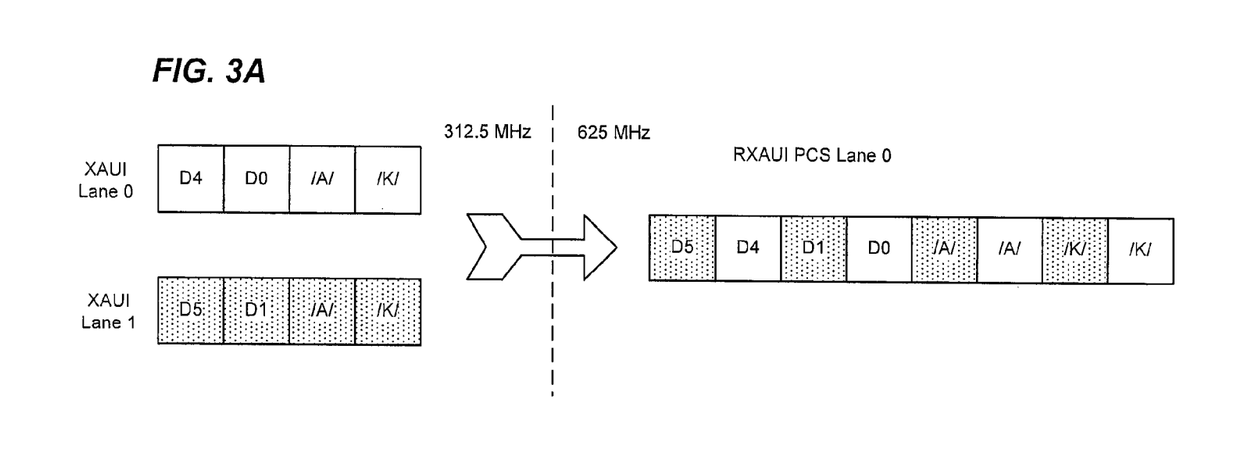
FIG. 3A is a diagram illustrating multiplexing of 10-bit data words from a 10 Gigabit Attachment Unit Interface (XAUI) Lane 0 and a XAUI Lane 1 onto a reduced XAUI (RXAUI) Lane.

FIG. 3A is a diagram illustrating the result of the RXAUI adapter 168 multiplexing data from the XAUI Lane 0 and the XAUI Lane 1 onto the RXAUI Lane 0 when the XAUI Lane 0 and the XAUI Lane 1 provide 10-bit words at 312.5 MHz, in accordance with an embodiment. In FIG. 3A, the block D0, D1, D4, D5 corresponds to a 10-bit data word. Also, each block "/A/" is an alignment symbol, and each block "/K/" is referred to as a "comma symbol" (or "comma") and is used in XAUI for frame alignment and for IDLE sequences when no data is transmitted. In general, the RXAUI adapter 168 alternately takes words from the XAUI Lane 0 and the XAUI Lane 1 and places them on the RXAUI Lane 0, and the RXAUI adapter 168 starts with the RXAUI Lane 0. Words are read from the XAUI lanes at a rate of 625 MHz.

As specified in the IEEE 802.3ae Standard, the alignment symbols (/A/) and the comma symbols (/K/) are utilized for XAUI frame synchronization and XAUI lane alignment. For instance, the comma symbol /K/ enables a XAUI receiver to attain frame alignment on a bit stream received on a XAUI lane. According to the IEEE 802.3ae Standard, a XAUI receiver is to align a frame to the comma symbol /K/ whenever it appears in a bit stream from a serial XAUI lane. Additionally, because serial XAUI lanes, as specified in the IEEE 802.3ae Standard, operate independently from one another and can often come out of alignment with respect to one another, lane alignment is to be accomplished by use of the alignment symbol /A/. The IEEE 802.3ae Standard defines specific times when the alignment symbol /A/ word should be transmitted on all four XAUI lanes simultaneously. As specified in the IEEE 802.3ae Standard, the alignment symbol /A/ and the comma symbol /K/ are bit patterns that are easily recognizable by the XGXS adapter 112. In other implementations, suitable symbols other than the /A/ and /K/ symbols specified by the IEEE 802.3ae Standard can be utilized.

Figure 3B:
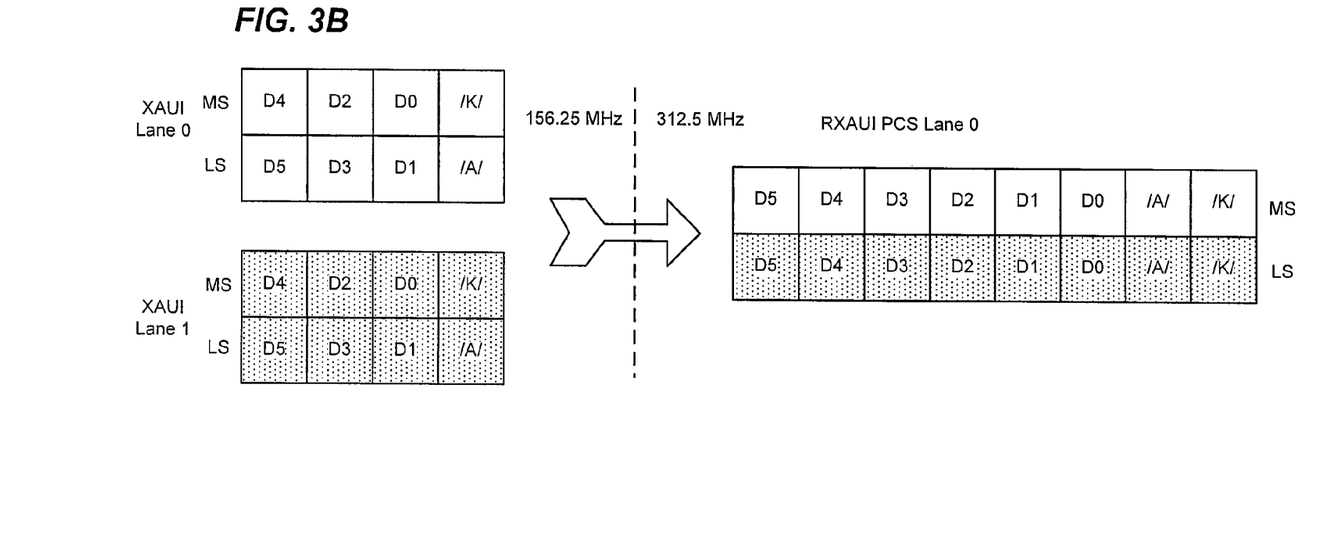
FIG. 3B is a diagram illustrating multiplexing of 20-bit data words data from a XAUI Lane 0 and a XAUI Lane 1 onto a reduced XAUI (RXAUI) Lane.

FIG. 3B is a diagram illustrating the result of the RXAUI adapter 168 multiplexing data from the XAUI Lane 0 and the XAUI Lane 1 onto the RXAUI Lane 0 when the XAUI Lane 0 and the XAUI Lane 1 provide 20-bit words at 156.25 MHz, in accordance with an embodiment. In FIG. 3B, the block D0, D1, D2, D4, D4, D5 corresponds to a 10-bit data symbol, and pairs of data symbols form 20-bit words, where a first 10-bit data symbol (the "most significant" data symbol) is the most significant 10-bits and a second 10-bit data symbol (the "least significant" data symbol) is the least significant 10-bits. Also, each block "/A/" is an alignment symbol, and each block "/K/" is referred to as a "comma symbol" (or "comma") and is used in XAUI for frame alignment, as discussed above. In other implementations, suitable symbols other than the /A/ and /K/ symbols specified by the IEEE 802.3ae Standard can be utilized. In general, the RXAUI adapter 168 alternately takes the most significant symbol and the least significant symbol from the XAUI Lane 0 and places them on the most significant symbol of the RXAUI Lane 0 one after the other, starting with the most significant symbol of XAUI Lane 0. Similarly, the RXAUI adapter 168 alternately takes the most significant symbol and the least significant symbol from the XAUI Lane 1 and places them on the least significant symbol of the RXAUI Lane 0 one after the other, starting with the most significant symbol of XAUI Lane 1.

Figure 4A:
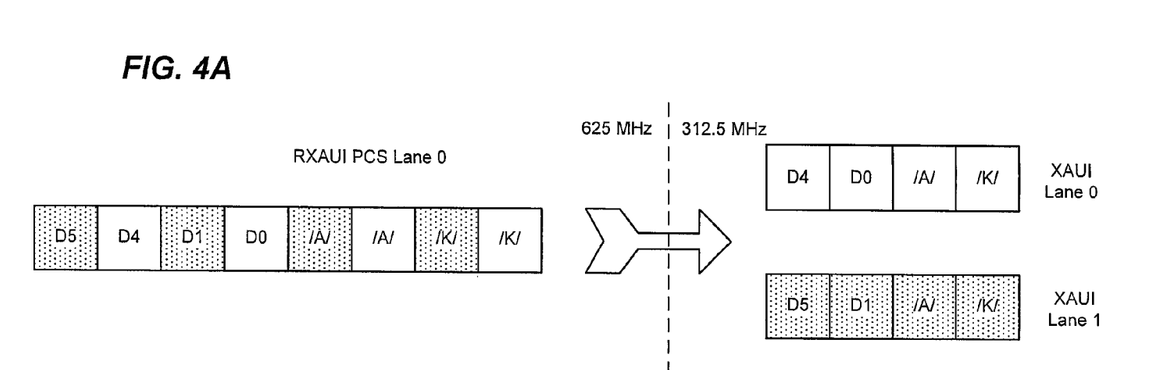
FIG. 4A is a diagram illustrating demultiplexing of 10-bit data words on a RXAUI Lane to a XAUI Lane 0 and a XAUI Lane 1.

FIG. 4A is a diagram illustrating the result of the RXAUI adapter 168 demultiplexing data from the RXAUI Lane 0 onto the XAUI Lane 0 and the XAUI Lane 1 when the XAUI Lane 0 and the XAUI Lane 1 provide 10-bit words at 312.5 MHz, in accordance with an embodiment. In general, in accordance with an embodiment, the RXAUI adapter 168 looks for the appearance of adjacent /A/ symbols, and assumes that the first /A/ symbol corresponds to XAUI Lane 0. Then, based on this assumption, the RXAUI adapter 168 alternately places words from the RXAUI Lane 0 onto the XAUI Lane 0 and the XAUI Lane 1, starting with placing the first /A/ symbol onto XAUI Lane 0. In an embodiment, the RXAUI adapter 168 continues this alternate placement and monitors whether subsequent /A/ symbols occur where expected (i.e., a first /A/ symbol of a pair of adjacent /A/ symbols is placed onto XAUI Lane 0 and a second /A/ symbol of the pair is placed onto XAUI Lane 1). In this embodiment, if a plurality of pairs of adjacent /A./ symbols do not occur where expected, the RXAUI adapter 168 again looks for the appearance of adjacent /A/ symbols and, when found, begins placing words as discussed above.

Figure 4B:
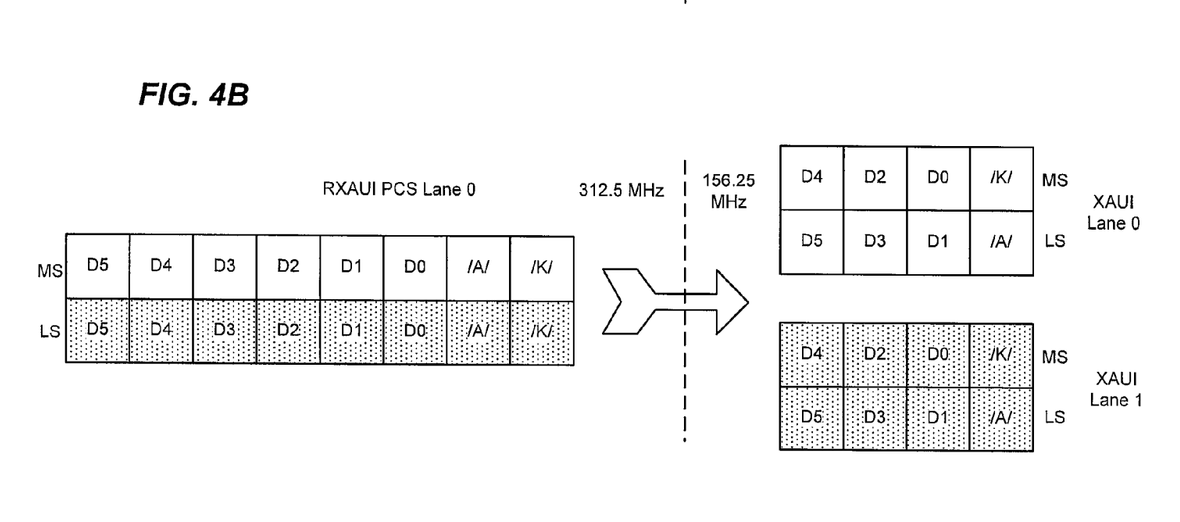
FIG. 4B is a diagram illustrating demultiplexing of 20-bit data words on a RXAUI Lane to a XAUI Lane 0 and a XAUI Lane 1.

FIG. 4B is a diagram illustrating the result of the RXAUI adapter 168 demultiplexing data from the RXAUI Lane 0 onto the XAUI Lane 0 and the XAUI Lane 1 when the XAUI Lane 0 and the XAUI Lane 1 provide 20-bit words at 156.25 MHz, in accordance with an embodiment. In general, the RXAUI adapter 168 looks for the appearance of adjacent /A/ symbols (i.e., two /A/ symbols in the same 20-bit word, or a most significant /A./ symbol and a least significant /A/ symbol in adjacent 20-bit words), and assumes that the most significant /A/ symbol corresponds to XAUI Lane 0. Then, based on this assumption, the RXAUI adapter 168 places most significant symbols from the RXAUI Lane 0 alternately as the most significant symbol and the least significant symbol of XAUI Lane 0, assuming the /A/ is the least significant symbol. Similarly, the RXAUI adapter 168 places least significant symbols from the RXAUI Lane 0 alternately as the most significant symbol and the least significant symbol of XAUI Lane 1, assuming the /A/ symbol is the least significant symbol. In an embodiment, the RXAUI adapter 168 continues this alternate placement and monitors whether subsequent /A/symbols occur where expected (i.e., a first /A/ symbol of a pair of adjacent /A/ symbols is placed onto XAUI Lane 0 as the least significant symbol and a second /A/ symbol of the pair is placed onto XAUI Lane 1 as the least significant symbol). In this embodiment, if a plurality of pairs of adjacent /A./ symbols do not occur where expected, the RXAUI adapter 168 again looks for the appearance of adjacent /A/ symbols and, when found, begins placing words as discussed above.

Figure 4C:
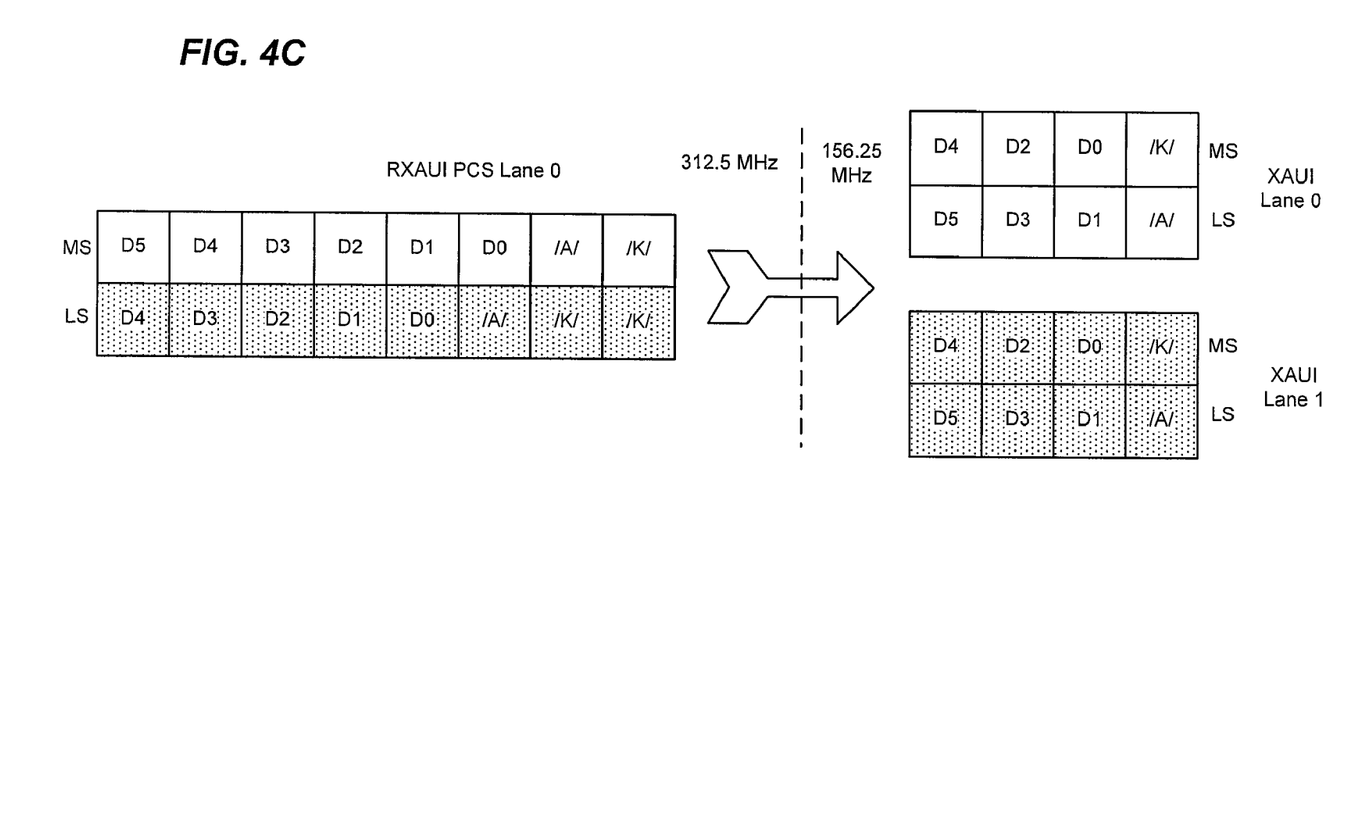
FIG. 4C is a diagram illustrating demultiplexing of skewed 20-bit data words on a RXAUI Lane to a XAUI Lane 0 and a XAUI Lane 1.

FIG. 4C is a diagram illustrating the result of the RXAUI adapter 168 demultiplexing data from the RXAUI Lane 0 onto the XAUI Lane 0 and the XAUI Lane 1 when the XAUI Lane 0 and the XAUI Lane 1 provide 20-bit words at 156.25 MHz, and when the there is a skew in the RXAUI Lane 0, in accordance with an embodiment. As discussed above, the RXAUI adapter 168 looks for the appearance of adjacent /A/symbols (e.g., in FIG. 4C, a most significant /A./ symbol and a least significant /A/symbol in adjacent 20-bit words), and assumes that the most significant /A/ symbol corresponds to XAUI Lane 0. Then, based on this assumption, the RXAUI adapter 168 places most significant symbols from the RXAUI Lane 0 alternately as the most significant symbol and the least significant symbol of XAUI Lane 0, assuming the /A/ is the least significant symbol. Similarly, the RXAUI adapter 168 places least significant symbols from the RXAUI Lane 0 alternately as the most significant symbol and the least significant symbol of XAUI Lane 1, assuming the /A/ symbol is the least significant symbol. Additionally, the RXAUI adapter 168 deskews the data by aligning 20-bit words between XAUI Lane 0 and XAUI Lane 1.

In an embodiment, the RXAUI adapter 168 continues the alternate placement discussed above and monitors whether subsequent /A/ symbols occur where expected (i.e., a first /A/ symbol of a pair of adjacent /A/ symbols is placed onto XAUI Lane 0 as the least significant symbol and a second /A/ symbol of the pair is placed onto XAUI Lane 1 as the least significant symbol). In this embodiment, if a plurality of pairs of adjacent /A./ symbols do not occur where expected, the RXAUI adapter 168 again looks for the appearance of adjacent /A/ symbols and, when found, begins placing words as discussed above.

FIGS. 3A, 3B, 4A, 4B, and 4C illustrate the operation of the RXAUI adapter 168. The RXAUI adapter 172 operates similarly.

Figure 5:
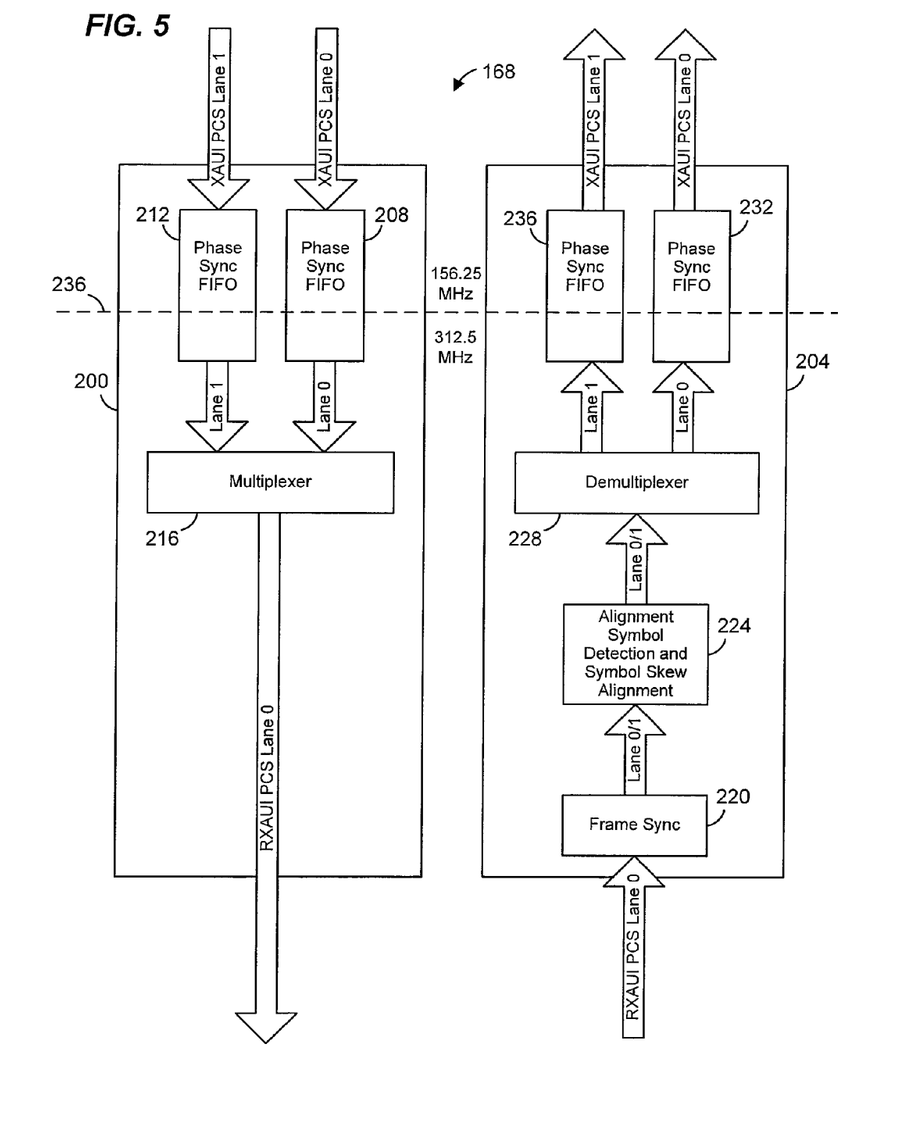
FIG. 5 is a block diagram of an example RXAUI adapter that may be utilized with the MAC block of FIG. 2.

FIG. 5 is a block diagram of an example implementation of the RXAUI adapter 168 of FIG. 2. The RXAUI adapter 172 of FIG. 2 may be implemented similarly. The RXAUI adapter 168 includes a transmit block 200 and a receive block 204. In accordance with an embodiment, the transmit block 200 receives words from the XAUI Lane 0 and the XAUI Lane 1 and multiplexes them onto the RXAUI Lane 0. The transmit block 200 includes a first-in-first-out (FIFO) memory 208 coupled to the XAUI Lane 0 and a FIFO memory 212 coupled to the XAUI Lane 1. The FIFO 208 and the FIFO 212 synchronize between the XAUI clock domain (312.5 MHz for 10-bit words, 156.25 MHz for 20-bit words) and the RXAUI clock domain (625 MHz for 10-bit words, 312.5 MHz for 20-bit words). For instance, data is read from the FIFO 208 and the FIFO 212, together, at twice the rate that data is written to the FIFO 208 or the FIFO 212 individually. In an embodiment, the clock signals utilized for writing data to the FIFO 208 and the FIFO 212 are generated (e.g., with a clock divider) from a clock signal used to read data from the FIFO 208 and the FIFO 212. In this embodiment, the frequency of the read and write clocks are synchronized. Thus, the frequency at which data is written to the FIFO 208 and the FIFO 212 is synchronized with the frequency at which data is read from the FIFO 208 and the FIFO 212. However, there generally is phase difference between when data is data is written to the FIFO 208 compared to when data is read from the FIFO 208, and there generally is a phase difference between when data is data is written to the FIFO 212 compared to when data is read from the FIFO 212.

A multiplexer 216 retrieves words from the FIFO 208 and the FIFO 212 and places them on the RXAUI Lane 0 as discussed above with respect to FIGS. 3A and 3B.

In accordance with an embodiment, the receive block 204 includes a frame sync block 220, which is coupled to the RXAUI Lane 0. The frame sync block 220 aligns received data to word or byte boundaries. In an embodiment, the frame sync block includes a comma detect block that searches for a comma symbol, /K/, in the data received via that RXAUI Lane 0. In this embodiment, when a comma is detected, the frame sync block 220 generates an indication of a lock status. Additionally, when a comma is detected, the frame sync block 220 sends locked data to an alignment symbol detection and skew alignment block 224. In one implementation, the 20-bit data received by the receive block 204 from the SERDES 184 is not aligned, i.e., the 20 bits received from the SERDES 184 are not aligned to word or byte boundaries. Thus, the frame sync block 220 aligns the output of the SERDES 184 to word boundaries. The frame sync block 220 can be enabled immediately after reset and can be disabled when both of Lane 0 and Lane 1 are indicated as being synchronized.

In the embodiment of FIG. 5, the alignment symbol detection and skew alignment block 224 generally searches for two successive or adjacent alignment symbols (i.e., {/A/,/A/}). Additionally, in a 20-bit implementation, the alignment symbol detection and skew alignment block 224 corrects for skew between XAUI Lane 0 words and XAUI Lane 1 words, such as depicted on the left-hand side of FIG. 4C. The alignment symbol detection and skew alignment block 224 is described in more detail below.

A demultiplexer 228 demultiplexes the output of the alignment symbol detection and skew alignment block 224 into two portions corresponding to XAUI Lane 0 and XAUI Lane 1. The demultiplexer 228 operates as discussed above with respect to FIGS. 4A-4C.

In an embodiment, output of the demultiplexer 228 is stored in a FIFO 232 and a FIFO 236. In particular, words corresponding to XAUI Lane 0 are stored in the FIFO 232 and words corresponding to XAUI Lane 1 are stored in the FIFO 236. In another embodiment, the FIFO 232 and the FIFO 236 may be single FIFO having the same width as the cumulative width of the FIFO 232 and the FIFO 236. The FIFO 232 and the FIFO 236 synchronizes between the RXAUI clock domain (625 MHz for 10-bit words, 312.5 MHz for 20-bit words) and the XAUI clock domain (312.5 MHz for 10-bit words, 156.25 MHz for 20-bit words) in a manner similar to the FIFO 208 and the FIFO 212 discussed above.

A line 236 generally indicates a division between two clock domains: for example, a 156.25 clock domain corresponding to XAUI, and a 312.5 MHz clock domain corresponding to RXAUI; other suitable clock speeds and domains are contemplated. For instance, data is written to the FIFOs 208, 212 at a speed corresponding to the XAUI clock domain, and data is read from the FIFOs 208, 212 at a faster speed corresponding to the RXAUI clock domain. Similarly, data is written to the FIFO 232 at a speed corresponding to the RXAUI clock domain, and data is read from the FIFO 232 at a slower speed corresponding to the XAUI clock domain.

Figure 6:
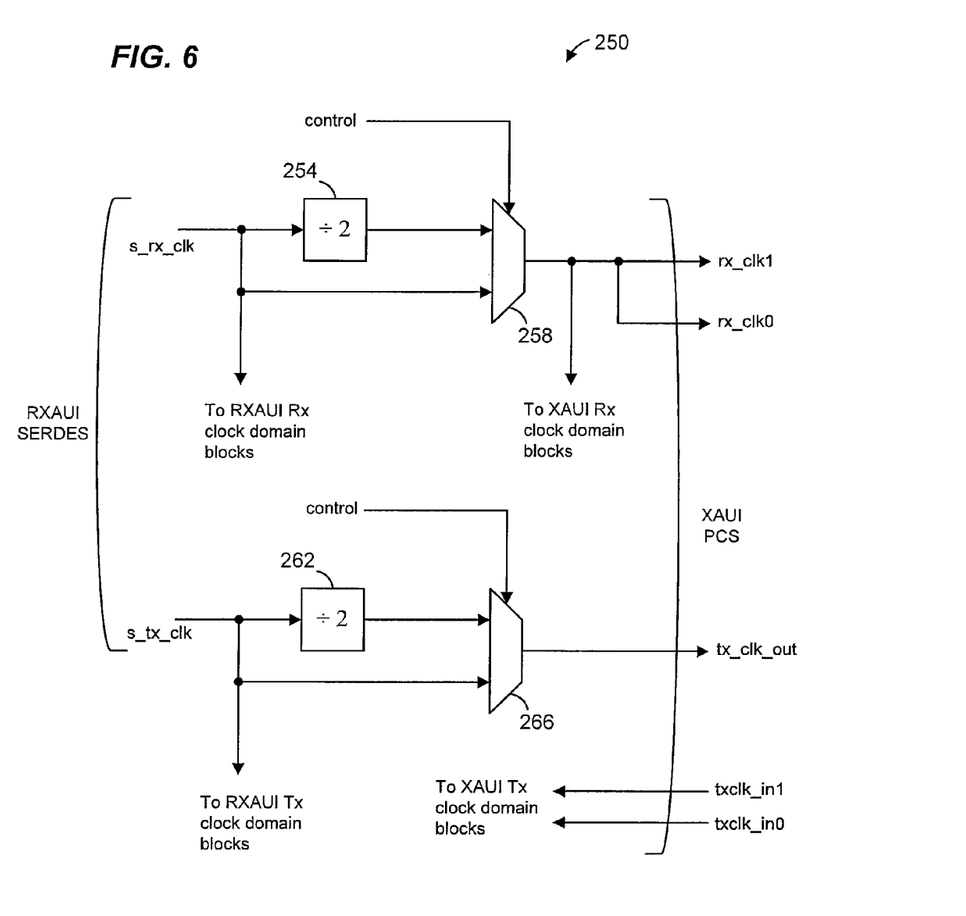
FIG. 6 is a block diagram of an example clock circuit that can be included in the RXAUI adapter of FIG. 5.

FIG. 6 is a block diagram of an example clock circuit 250 that can be included in the example RXAUI adapter 168 described with reference to FIG. 5. FIG. 6 is described with reference to FIGS. 2 and 5 for explanatory purposes. In an embodiment, clock signals s_rx_clk and s_tx_clk 312.5 MHz clocks are provided by a SERDES, such as the SERDES 184, 188 (FIG. 2). The s_rx_clk clock is generally provided to the RXAUI clock domain of the receive block 204. Data received from the SERDES is synchronized to the s_rx_clk. The signal s_rx_clk is used by blocks in the RXAUI domain of the receive block 204 such as FIFOs 232, 236. For example, data is written to the FIFOs 232, 236 using s_rx_clk.

The s_rx_clk is provided to a frequency divider 254 that generates a clock signal having one half the frequency of s_rx_clk. Both s_rx_clk and the output of the frequency divider 254 are coupled inputs of a multiplexer 258. A control signal selects one of the inputs of the multiplexer 258 to be provided as receive clocks for the XAUI clock domain. For RXAUI operation, the output of the frequency divider 254 is selected. For XAUI pass-through, s_rx_clk is selected.

The output of the multiplexer 258 is used for clock signals rx_clk0 and rx_clock1. The 20-bit data issued to XAUI PCS Lane 0 is synchronized to clock rx_clk0, and the 20-bit data issued to XAUI PCS Lane 1 is synchronized to clock rx_clk1. The output of the multiplexer 258 is also used for other XAUI clock portions of the receive block 204, such as for reading data from the FIFO 232.

As discussed above, the clock signal s_tx_clk clock is provided by the SERDES and is generally provided to the RXAUI clock domain of the transmit block 200. Data transmitted to the SERDES is synchronized to the s_tx_clk. The signal s_tx_clk is used by blocks in the RXAUI domain of the transmit block 200 such as FIFOs 208, 212. For example, data is read from the FIFOs 208, 212 using s_tx_clk.

The s_tx_clk is provided to a frequency divider 262 that generates a clock signal having one half the frequency of s_tx_clk. Both s_tx_clk and the output of the frequency divider 262 are coupled inputs of a multiplexer 266. A control signal selects one of the inputs of the multiplexer 266 to be provided as transmit clocks for the XAUI clock domain. For RXAUI operation, the output of the frequency divider 262 is selected. For XAUI pass-through, s_tx_clk is selected.

The output of the multiplexer 266 provides a clock signal tx_clk_out. The signal tx_clk_out is provided to the XGXS adapter 112, which uses it to generate a 156.25 MHz clock. The XGXS adapter 112 generates signals txclk_in0 and txclk_in1 using tx_clk_out. The 20-bit data received from XAUI PCS Lane 0 is synchronized to clock txclk_in0, and the 20-bit data received from XAUI PCS Lane 1 is synchronized to clock txclk_in1. The signals txclk_in0 and txclk_in1 are also used for other XAUI clock portions of the transmit block 200, such as for writing data to the FIFOs 208 and 212 (FIG. 5).

Figure 7:
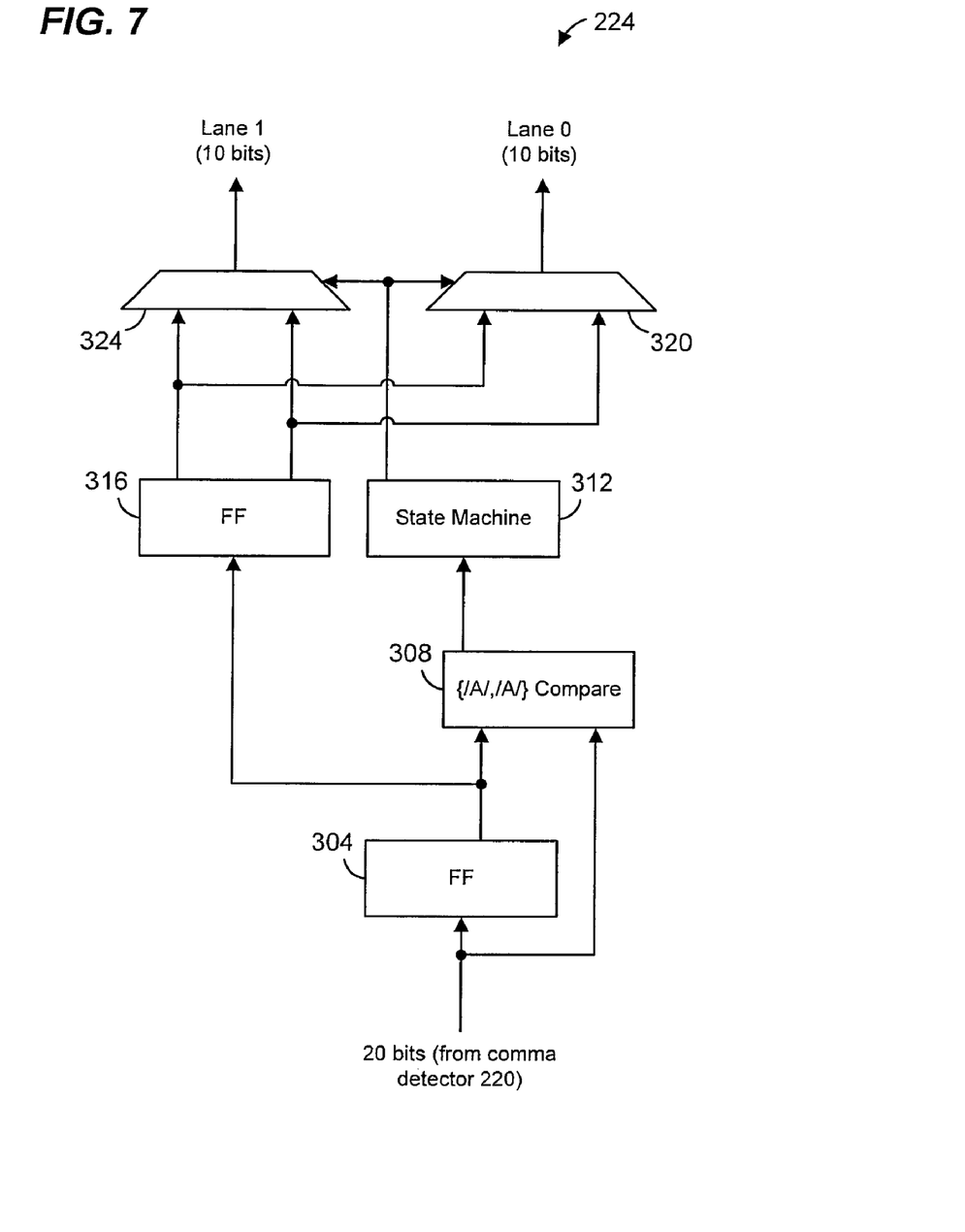
FIG. 7 is a block diagram of an example alignment symbol detection and skew alignment block that may be utilized with the RXAUI adapter of FIG. 5.

FIG. 7 is a block diagram of an example implementation of the alignment symbol detection and skew alignment block 224 of FIG. 5. FIG. 7 will be described with reference to FIG. 5 for explanatory purposes. A memory 304 (e.g., a latch, flip-flop (FF), or any suitable memory device) receives a 20-bit data word from the comma detector 220. In accordance with an embodiment of the disclosure, data is clocked into the memory 304 using s_tx_clk. A comparator block 308 also receives the 20-bit data word from the comma detector 220. The comparator block 308 analyzes the 20-bit data word from the comma detector 220 and an output of the memory 304 to determine if there are adjacent symbols {/A/,/A/}. For example, the comparator 308 checks whether there are adjacent symbols {/A/,/A/} such as illustrated in the left-hand portions of FIGS. 4B and 4C.

When the comparator 308 detects adjacent symbols {/A/,/A/}, the comparator generates an indicator that is provided to a state machine 312. The state machine 312 generally controls the placement of the 10 most significant bits (msb) and the 10 least significant bits (10 lsb) of the input from the comma detector 220 onto Lane 0 and Lane 1 provided to the demultiplexer 228. Operation of the state machine 312 will be described in more detail below.

The output of the memory 304 is provided to another memory 316 (e.g., a latch, a FF, etc.). Ten msb of an output of the memory 316 are provided as a first input to a multiplexer 320. The 10 msb of the output of the memory 316 are also provided as a first input to a multiplexer 324. Ten lsb of the output of the memory 316 are provided as a second input to the multiplexer 320. The 10 lsb of the output of the memory 316 are also provided as a second input to the multiplexer 324. Selection of the inputs of the multiplexers 320, 324 is controlled by the state machine 312. In particular, the state machine 312 generates a selection signal to control the selection of the inputs of the multiplexers 320, 324.

In accordance with an embodiment of the disclosure, the alignment symbol detection and skew alignment block 224 generally looks for adjacent symbols {/A/,/A/} in the signal received from the comma detector 220. Once detected, the first /A/ is directed to Lane 0, the next /A/ goes to Lane 1, and from this point, data is alternately directed to Lane 0 and to Lane 1. Then, the alignment symbol detection and skew alignment block 224 continues looking for adjacent symbols {/A/,/A./}. When found, the distribution order is checked for correctness, i.e., the first /A/ is indeed targeted to Lane 0. The alignment symbol detection and skew alignment block 224 enforces the first /A/ is forwarded to Lane 0 only after three consecutive errors in forwarding correctness.

Figure 8:
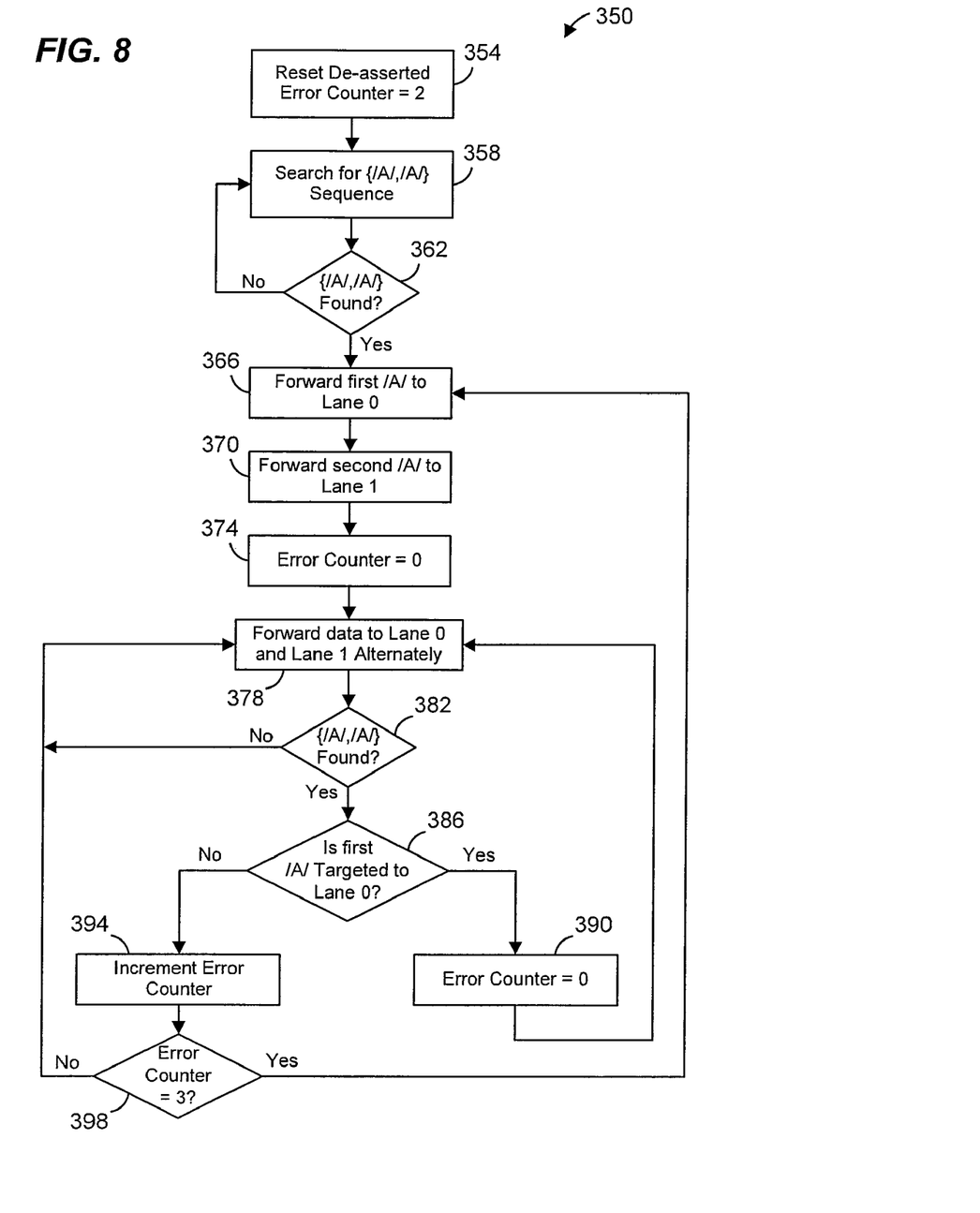
FIG. 8 a flow diagram of an example method for controlling the demultiplexing of data on a RXAUI Lane to a XAUI Lane 0 and a XAUI Lane 1.

FIG. 8 is a flow diagram of an example method 350 that is implemented using the state machine 312 of FIG. 7. The method 350 is described with reference to FIG. 7 for explanatory purposes. The method 350 is discussed in the context of 10-bit words. Similar methods may be utilized with 20-bit words and other suitable word lengths. In accordance with an embodiment, the method 350 begins at block 354 after a reset signal is de-asserted for example. At block 354, an error counter is set to 2. At block 358, the adjacent symbols {/A/,/A/} are searched for. For example, the state machine 312 may wait for an indicator from the comparator 308. If the adjacent symbols {/A/,/A/} have not yet been detected, the flow reverts back to block 358 to continue searching for adjacent symbols {/A/,/A/}. After reset, and while waiting for the first detection of the adjacent symbols {/A/,/A/} (blocks 358 and 362), the state machine 312 may cause 10-bit blocks of the input from the comma detector 220 to be alternately passed to Lane 0 and Lane 1 without guarantee of data correctness.

If the adjacent symbols {/A/,/A/} are detected t block 362, the flow proceeds to block 366. At block 366, the first /A/ in the detected adjacent symbols {/A/,/A/} is forwarded to Lane 0. At block 370, the second /A/ in the detected adjacent symbols {/A/,/A/} is forwarded to Lane 1. At block 374, the Error Counter is set to zero. At block 378, data is forwarded alternately to Lane 0 and Lane 1.

At block 378, the adjacent symbols {/A/,/A/} are searched for. For example, the state machine 312 may check whether an indicator from the comparator 308 is received. If the adjacent symbols {/A/,/A/} are not detected, the flow reverts back to block 378. If the adjacent symbols {/A/,/A/} are detected at block 382, the flow proceeds to block 386.

At block 386, it is determined whether the first /A/ in the adjacent symbols {/A/,/A/} is targeted to Lane 0. If the first /A/ in the adjacent symbols {/A/,/A/} is targeted to Lane 0, the flow proceeds to block 390. At block 390, the Error Counter is set to zero, and the flow reverts back to block 378.

On the other hand, if it is determined at block 386 that the first /A/ in the adjacent symbols {/A/,/A/} is not targeted to Lane 0, the flow proceeds to block 394. At block 394, the Error Counter is incremented and the flow proceeds to block 398. At block 398, it is determined whether the Error Counter equals 3. If the Error Counter does not equal 3, the flow reverts back to block 378. On the other hand, if the Error Counter equals 3, the flow proceeds back to block 366.

In accordance with an embodiment, the method 350 can be terminated by a reset condition. Upon exiting the reset condition, the method 350 begins at block 354.

Referring again to FIG. 5, in one implementation, the RXAUI adapter 168 is implemented on a single integrated circuit. In other implementations, the RXAUI adapter 168 is implemented on a plurality of integrated circuits.

Each of the blocks of FIGS. 1, 2, 5, 6 and 7, and the method 350 of FIG. 8 may be implemented by hardware. More generally, however, the blocks of FIGS. 2, 5, 6 and 7, and the method 350 of FIG. 8 may be implemented using hardware, a processor executing firmware instructions, a processor executing software instructions, or any combination thereof. When a block is implemented at least partially using a processor that executes software instructions, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software instructions may be delivered to a user or a system via any known or desired delivery method including, for example, on a computer readable disk or other transportable computer storage mechanism or via communication media. When implemented in hardware, the hardware may comprise one or more of discrete components, an integrated circuit, an application-specific integrated circuit (ASIC), etc. Referring to FIG. 1, the system 100 can be implemented on a single integrated circuit or multiple integrated circuits mounted on one or several printed circuit boards.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A data transfer interface for use in a system in which alignment symbols are added to each of a plurality of first parallel data streams prior to converting the plurality of first parallel data streams to a serial data stream, the data transfer interface comprising:
    at least one deserializer to receive the serial data stream and to output a second parallel data stream, wherein the second parallel data stream includes data symbols representing data and the alignment symbols added prior to converting the plurality of first parallel data streams to the serial data stream;
    an alignment symbol detector to detect adjacent alignment symbols in the second parallel data stream, the adjacent alignment symbols corresponding to alignment symbols added to different ones of the first parallel data streams prior to converting the plurality of first parallel data streams to the serial data stream; and
    a demultiplexer that demultiplexes the second parallel data stream into a plurality of third parallel data streams based on detected adjacent alignment symbols in the second parallel data stream.

2. A data transfer interface according to claim 1, wherein the demultiplexer includes a frame synchronization block to align data in the second parallel data stream to word boundaries.

3. A data transfer interface according to claim 1, wherein the deserializer outputs the second parallel data stream to include 20-bit words.

4. A data transfer interface according to claim 3, wherein the 20-bit words are physical coding sublayer (PCS) words.

5. A data transfer interface according to claim 1, wherein the deserializer outputs the second parallel data stream to include 10-bit words.

6. A data transfer interface according to claim 5, wherein the 10-bit words are physical coding sublayer (PCS) words.

7. A data transfer interface according to claim 1, further comprising an adaptor to combine the plurality of third parallel data streams into a combined fourth parallel data stream that conforms to the IEEE 802.3ae Standard.

8. A data transfer interface according to claim 1, wherein the deserializer is a component of a serializer/deserializer (SERDES).

9. A data transfer interface method for use in a system in which alignment symbols are added to each of a plurality of first parallel data streams prior to converting the plurality of first parallel data streams to a serial data stream, comprising:
    converting the serial data stream to a second parallel data stream, wherein the second parallel data stream includes data symbols representing data symbols and the alignment symbols added prior to converting the plurality of first parallel data streams to the serial data stream; and
    detecting adjacent alignment symbols in the second parallel data stream, the adjacent alignment symbols corresponding to alignment symbols added to different ones of the first parallel data streams prior to converting the plurality of first parallel data streams to a serial data stream; and
    demultiplexing the second parallel data stream into a plurality of third parallel data streams based on detected adjacent alignment symbols in the second parallel data stream.

10. A method according to claim 9, further comprising:
    detecting a comma symbol in the second parallel data stream; and
    aligning data in the second parallel data stream based on detection of the comma symbol.

11. A method according to claim 9, wherein the second parallel data stream includes 20-bit words.

12. A method according to claim 9, wherein the second parallel data stream includes 10-bit words.

13. A method according to claim 9, further comprising combining the plurality of third parallel data streams into a combined fourth parallel data stream that conforms to the IEEE 802.3ae Standard.

14. A data transfer interface for use in a system that converts a first parallel data stream to a serial data stream, the data transfer interface comprising:
    an adapter to convert the first parallel data stream into a plurality of second parallel data streams, and to add alignment symbols to each of the second parallel data streams; and
    at least one multiplexer that multiplexes at least two of the plurality of second parallel data streams into a third parallel data stream according to a fixed relationship with the alignment symbols from at least two of the plurality of second parallel data streams, wherein the third parallel data stream is for subsequent conversion to the serial data stream.

15. A data transfer interface according to claim 14, wherein the multiplexer multiplexes two second parallel data streams such that the third parallel data stream includes two adjacent alignment symbols between pairings of words from the two second parallel data streams.

16. A data transfer interface according to claim 15, wherein the multiplexer multiplexes two second parallel data streams such that words from the two second parallel data streams are alternately placed in the third parallel data stream, and a word from a particular one of the two second parallel data streams always follows the two adjacent alignment symbols.

17. A data transfer interface according to claim 14, further comprising a serializer to convert the third parallel data stream to the serial data stream.

18. A network switch, comprising:

a first data transfer interface configured to convert a plurality of first parallel data streams to a serial data stream, and to add alignment symbols to each first parallel data stream;

a second data transfer interface including:

at least one deserializer to receive the serial data stream and to output a second parallel data stream, wherein the first parallel data stream includes data symbols representing data and the alignment symbols added by the first data transfer interface, an alignment symbol detector to detect adjacent alignment symbols in the second parallel data stream, the adjacent alignment symbols corresponding to alignment symbols added to different ones of the first parallel data streams by the first data transfer interface; and a demultiplexer that demultiplexes the second parallel data stream into a plurality of third parallel data streams based on detected adjacent alignment symbols in the second parallel data stream.

19. A network switch according to claim 18, wherein the first data transfer interface includes:

an adapter to convert a fourth parallel data stream into the plurality of first parallel data streams, and at least one multiplexer that multiplexes at least two of the plurality of first parallel data streams into a fifth parallel data stream according to a fixed relationship with the adjacent alignment symbols from at least two of the plurality of first parallel data streams.

20. A network switch according to claim 19, wherein the first data transfer interface further includes a serializer to convert the fifth parallel data stream to the serial data stream.

* * * * *